Sept. 22, 1925.  
A. A. MARTELL  
ADJUSTABLE PLUG GAUGE  
Filed July 19, 1922

Inventor  
Albert A. Martell  
By George Ramsey  
Attorney

Sept. 22, 1925. 1,554,226
A. A. MARTELL
ADJUSTABLE PLUG GAUGE
Filed July 19, 1922 2 Sheets-Sheet 2

Inventor
Albert A. Martell
By George Ramsey
his Attorney

Patented Sept. 22, 1925.

1,554,226

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

ADJUSTABLE PLUG GAUGE.

Application filed July 19, 1922. Serial No. 575,972.

*To all whom it may concern:*

Be it known that I, ALBERT A. MARTELL, a citizen of the United States, residing at Woonsocket, in the county of Providence, State of Rhode Island, have invented certain new and useful Improvements in Adjustable Plug Gauges, of which the following is a specification.

This invention relates broadly to small tools and more specially to gauges or measuring devices and the like.

The principal object of the present invention is to provide a small tool in the form of an expanding or adjustable plug gauge which is adapted for use as an internal micrometer.

Other and further objects of the present invention will in part be obvious and will in part be pointed out hereinafter in the specification following by reference to the accompanying drawings throughout which like characters are used to represent like parts.

It is realized that the present invention may be embodied in constructions other than those herein shown and may be useful for purposes other than those herein specifically set forth and therefore it is desired that the present disclosure shall be considered as illustrative and not in the limiting sense.

Figure 1:
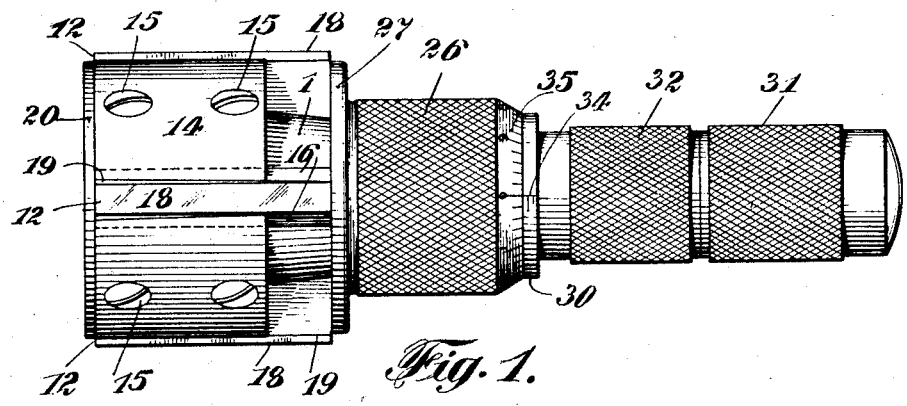
Figure 1 is a plan view of one embodiment of the present invention.

Referring now to the drawings in which is illustrated one embodiment of the present invention, the shank A is provided with a conical portion 1, a screw threaded cylindrical portion 2 adjacent the small end of the conical portion, and with a clearance groove 4 between the conical portion and the cylindrical screw threaded portion. A small cylindrical longitudinal portion 5 extends from the screw threaded portion 2 to the end of the shank. The reduction in diameter between the two cylindrical portions forms a shoulder 6, the function of which will be hereinafter explained. The small cylindrical portion 5 is provided on its outer end with a screw threaded zone 7. The conical portion 1 is also provided with screw threaded openings 8 to hold the screws for the blade clamps. The shank A is provided with a cylindrical opening axially arranged, which opening comprises a recess 9 in the end of the conical portion 1, a recess 10 which extends substantially the length of the screw threaded cylindrical portion 2 and the small cylindrical portion 5, and with a small recess or opening 11 joining the recesses 9 and 10.

The shank carries a plurality of blades 12, of which four are illustrated but obviously any number may be used, which are held in place on the conical portion 1 by means of clamp blocks 14 that are secured in place by machine screws 15 which are screw threaded into the openings 8 of the conical member. The sides 16 of the blades taper upwardly at a uniform rate from a flat or plane base 17, and the edges of the blade blocks 14 overhang these tapering sides. The gauge face 18 of the blades is angularly disposed relatively to the flat base and in order that the gauge faces shall be of uniform width, shoulders 19 are provided adjacent the forward end of the blades. It will be noted the flat bases on the blades and the conical seat causes the contact between the blades and the seat to comprise a single line, while the sides of the blades are clamped against the blade blocks. This arrangement forms a very accurate three point support for the blades which gives great accuracy to the gauge.

Figure 2:
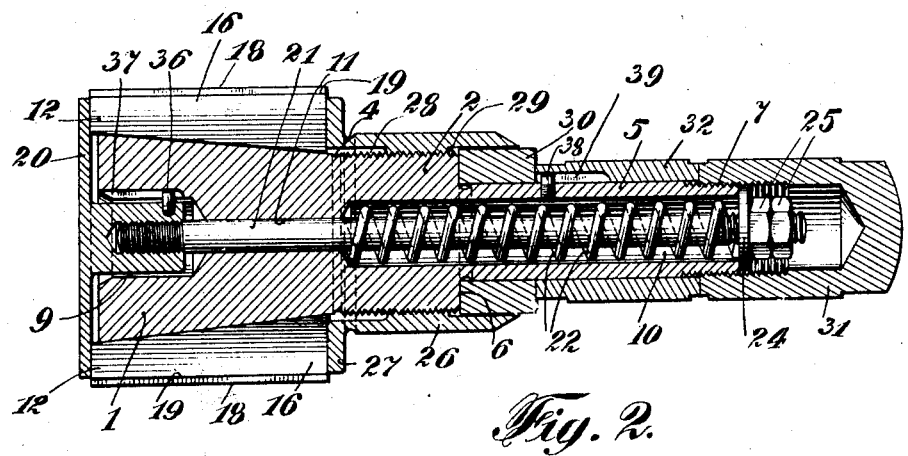
Figure 2 is a longitudinal section of the device shown in Figure 1.
Figure 3:
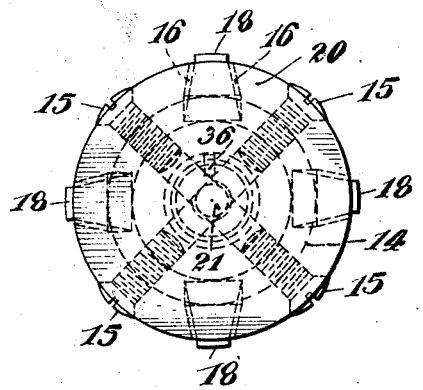
Figure 3 is an end view of the device shown in Figure 1.
Figure 4:
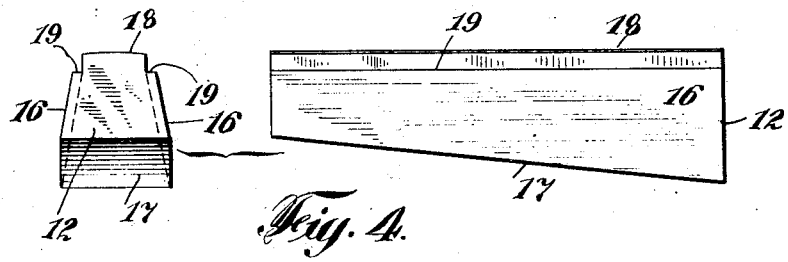
Figure 4 illustrates a side and end view of one of the blade members.
Figure 5:
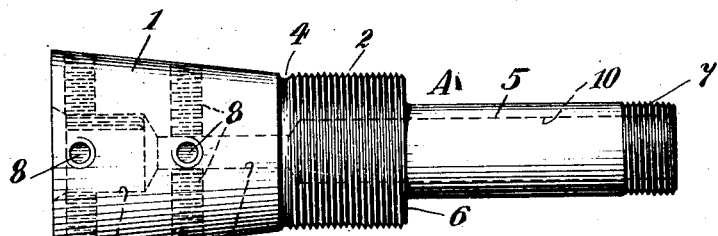
Figure 5 is a plan view of the shank of the device.
Figure 6:
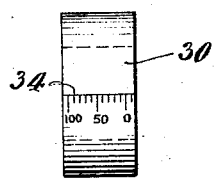
Figure 6 is a plan view of the collar carrying the departure scale.
Figure 7:
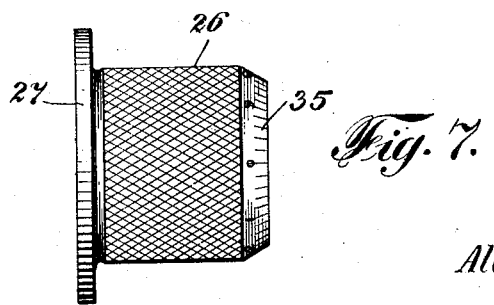
Figure 7 is a view of the sleeve carrying the micrometer scale.

An abutment disk 20 engages the forward ends of the blades 12. This abutment disk is carried upon a rod 21 which extends through the recesses 9, 10, and 11, and which rod carries a relatively heavy coil spring 22. This coil spring presses against a stop washer 24 which is adjustably mounted on the rod 21 by means of the lock nuts 25 that are screw threaded on the outer end of the rod 21. It will be noted that this stop washer 24 is adapted to abut against the end of the small cylindrical portion 5 of the shank A (Figures 2 and 5) thereby limiting the outward movement of the abutment disk 20 and consequently the maximum limit of the gauge.

A micrometer sleeve 26 is screw threaded upon the cylindrical portion 2 of the shank and is provided with a flange 27 that engages the inner ends of the blades and sustains the force exerted on the front ends of the blades by the abutment disk 20 due to the coil spring 22. This micrometer sleeve 26 is cut away at 28 to permit the sleeve to move forwardly over the inner end of the conical portion 1 and is also cut away at the opposite end to provide a shoulder 29. A plain smooth index collar 30 is rotatably mounted upon the small cylindrical portion 5 and is adapted to be locked from rotating by being clamped against the shoulder 6 (Figures 2 and 5) on the shank A by means of a clamp cap sleeve 31 which pushes against the compression sleeve 32 that contacts with the index collar 30 and thereby transmits the clamping force of clamp sleeve 31 to the said collar 30. The clamp cap sleeve and the compression sleeve may be suitably knurled to form a handle for the gauge. The collar 30 carries an index 34 which reads in conjunction with a micrometer scale 35 on the micrometer sleeve 26. The abutment disk 20 is prevented from rotation by means of the pin 36 on the hub of the disk sliding in the slot 37 in the recess 9 and in a similar manner the compression sleeve 32 is prevented from rotating by means of the pin 38 on the shank which engages the slot 39 in said compression sleeve.

From the foregoing description it will be obvious that by removing the cap sleeve 31 the lock nuts 25 may be adjusted so that the stop washer 24 will be brought against the end of the shank A and the blades 12 may then expand to a predetermined maximum dimension by threading the micrometer sleeve 26 outwardly on the screw threaded portion 2. It therefore will appear that the stop washer 24, which is adjustable by means of the lock nuts 25, comprises the stop for the maximum limit of expansion and because of the adjustability of the lock nuts 25 the maximum limit may be easily changed when desired. It likewise will appear that the engagement of the shoulder 29 on the micrometer sleeve 26 with the collar 30 determines the minimum limit of contraction for the blades 12. However, it will be clear that the zero, or standard at which the gauge is set, may be predetermined as desired by loosening the cap clamp sleeve 31 and rotating the collar 30 with the micrometer sleeve 26 until the blades have been expanded to a predetermined dimension, at which time the collar 30 is to be clamped solidly in position by tightening up the clamp sleeve 31 so that the index 34 of the index collar 30 and the zero on the micrometer scale coincide. From this point measurements may be taken within the limits of the gauge in either a plus or minus direction, assuming, of course, that the micrometer sleeve 26 has been rotated sufficiently to remove the shoulder 29 such a distance from the sleeve 30 as will permit minus readings to be taken.

From the foregoing it will be observed that the present device is an expanding small tool of great accuracy which may be utilized either as a plug gauge or a micrometer and may also be utilized for other purposes without departing from the scope of the invention.

Having described my invention, what I claim is:

1. An expansible tool comprising a shank provided with the frustum of a cone forming a blade seat, blades mounted upon said frustum of a cone, spring pressed means normally tending to slide said blades in one direction on said frustum of a cone, and non-yielding adjustable means for sustaining the spring pressure and limiting the movement of said blades.

2. An expansible tool comprising a shank provided with the frustum of a cone forming a blade seat, blades mounted upon said frustum of a cone, clamp blocks to hold said blades from moving laterally on said frustum, spring pressed means normally tending to slide said blades in one direction on said frustum of a cone, and non-yielding adjustable means for sustaining the spring pressure and limiting the movement of said blades.

3. An expansible tool comprising a shank provided with the frustum of a cone forming a blade seat, blades mounted upon said frustum of a cone, spring pressed means normally tending to slide said blades in one direction on said frustum of a cone, non-yielding adjustable means for sustaining the spring pressure, and stops for limiting the movement of said blades.

4. An adjustable plug gauge comprising a hollow shank having a tapered portion, a coiled spring mounted within said hollow shank, blades adjustably mounted upon said tapered portion, whereby longitudinal movement of said blades on said shank causes operative faces on said blades to advance or recede from the axis of the shank, means to operatively connect said coiled spring with said blades to cause said spring to normally exert compression forces on said blades, and adjustable means for sustaining said compression forces.

5. An adjustable plug gauge comprising a hollow shank having a tapered portion, a coiled spring mounted within said hollow shank, blades adjustably mounted upon said tapered portion, said blades having converging sides, blade holders overhanging the sides of said blades whereby longitudinal movement of said blades on said shank causes operative faces on said blades to advance or recede from the axis of the shank, means to operatively connect said coiled spring with said blades to cause said spring to normally exert compression forces on said blades, and adjustable means for sustaining said compression forces.

6. An adjustable plug gauge comprising a hollow shank having a tapered portion, a coiled spring mounted within said hollow shank, blades adjustably mounted upon said tapered portion, whereby longitudinal movement of said blades on said shank causes operative faces on said blades to advance or recede from the axis of the shank, means to operatively connect said coiled spring with said blades to cause said spring to normally exert compression forces on said blades, adjustable means for sustaining said compression forces, and a measuring scale to measure the extent of movement of the adjustment means.

7. An adjustable plug gauge comprising a hollow shank having a tapered portion, a coiled spring mounted within said hollow shank, blades adjustably mounted upon said tapered portion whereby longitudinal movement of said blades on said shank causes operative faces on said blades to advance or recede from the axis of the shank, means to operatively connect said coiled spring with said blades to cause said spring to normally exert compression forces on said blades, adjustable means for sustaining said compression forces, a measuring scale to measure the extent of movement of the adjustment means, and a stop adjustable to limit the movement of the adjustable means.

8. An adjustable plug gauge comprising a hollow shank having a tapered portion, a coiled spring mounted within said hollow shank, blades adjustably mounted upon said tapered portion, said blades having converging sides, blade holders overhanging the sides of said blades whereby longitudinal movement of said blades on said shank causes operative faces on said blades to advance or recede from the axis of the shank, means to operatively connect said coiled spring with said blades to cause said spring to normally exert compression forces on said blades, adjustable means for sustaining said compression forces, and a measuring scale to measure the extent of movement of the adjustment means.

9. An adjustable plug gauge comprising a hollow shank having a tapered portion, a coiled spring mounted within said hollow shank, blades adjustably mounted upon said tapered portion whereby longitudinal movement of said blades on said shank causes operative faces on said blades to advance or recede from the axis of the shank, means to operatively connect said coiled spring with said blades to cause said spring to normally exert compression forces on said blades, adjustable means for sustaining said compression forces, and a stop adjustable to limit the movement of the adjustable means.

10. A gauge comprising a hollow shank, a plurality of adjustable blades mounted upon said shank, a micrometer sleeve to move said blades in one direction and spring pressed means to move said blades in the opposite direction, said spring pressed means being mounted within said shank.

11. A gauge comprising a hollow shank, a plurality of adjustable blades mounted to slide longitudinally upon said shank, a micrometer sleeve to move said blades in one direction and spring pressed means extending under the blades and tending to move said blades in the opposite direction.

12. An adjustable plug gauge comprising a shank, adjustable blades mounted upon said shank, a micrometer sleeve, there being a scale on said micrometer sleeve for indicating the adjustment of said blades, an index collar adjustably mounted adjacent said micrometer sleeve, there being an index scale upon said index collar adapted to be read in conjunction with said micrometer scale, and means for clamping said index collar in adjusted positions.

13. An adjustable plug gauge comprising a shank having thereon a conical portion, adjustable blades mounted upon said conical portion, a micrometer sleeve, there being a scale on said micrometer sleeve for indicating the adjustment of said blades, an index collar adjustably mounted adjacent said micrometer sleeve, there being an index scale upon said index collar adapted to be read in conjunction with said micrometer scale, and means for clamping said index collar in adjusted positions.

14. An adjustable plug gauge comprising a shank, adjustable blades mounted upon said shank, a micrometer sleeve, there being a scale on said micrometer sleeve for indicating the adjustment of said blades, an index collar adjustably mounted to rotate upon the shank adjacent said micrometer sleeve, there being an index scale upon said index collar adapted to be read in conjunction with said micrometer scale, and means for clamping said index collar in adjusted rotative positions.

15. An adjustable plug gauge comprising a shank, a plurality of adjustable blades mounted on said shank, a micrometer sleeve screw threaded upon said shank and being adapted to engage said blades, there being a micrometer scale on said micrometer sleeve adapted to indicate the adjustment of said blades, an index collar rotatably mounted upon said shank, there being an index scale upon said index collar, a compression sleeve adjacent said index collar, and means to tightly clamp said sleeve against said index collar to lock said index collar against rotation.

16. An adjustable plug gauge comprising a shank having an inclined blade seat portion thereon, a plurality of adjustable blades mounted on said inclined portion, there being a micrometer sleeve screw threaded upon said shank and being adapted to engage said blades to adjust said blades, a micrometer scale on said micrometer sleeve and being adapted to indicate the adjustment of said blades, an index collar rotatably mounted upon said shank, there being an index scale upon said index collar, a compression sleeve adjacent said index collar, and means to tightly clamp said sleeve against said index collar to lock said index collar against rotation.

17. A device of the class described comprising a shank provided with a blade seat, a blade mounted on said seat, spring pressed means normally tending to slide said blade in one direction on said seat, adjustable means for supporting said spring pressure and indicating the position of said blade on said seat, and stops for limiting the movement of said blade in either direction.

18. A device of the class described comprising a hollow shank provided with a blade seat, a blade mounted on said seat, spring pressed means mounted within the shank and normally tending to slide said blade in one direction on said seat, and stops for limiting the movement of said blade.

19. A gauge comprising a hollow shank, blades adjustably mounted on said shank, a coiled spring mounted within said shank, a movable abutment member operatively associated with said blades, a rod operatively connecting said abutment member with said spring, adjustable means for limiting the movement of said abutment member against the action of said spring, and guide means cooperating with said blades.

20. A gauge comprising a hollow shank, blades adjustably mounted on said shank, a coiled spring mounted within said shank, an abutment member bearing upon the outer end of the blades, a rod operatively connecting said abutment member with said coiled spring, adjustable means comprising a micrometer sleeve for limiting the movement of said abutment member by said spring, and guide means cooperating with said blades.

21. A plug gauge comprising a shank, a plurality of adjustable blades associated with said shank, positive means adapted to move longitudinally of said shank to move said blades both axially and radially of said shank, and resilient means opposing the movement of said blades.

22. A plug gauge comprising a shank, a surface longitudinally inclined to said shank, a plurality of blades mounted on said surface and means to move said blades longitudinally of said shank for adjustment radially of said shank.

23. A plug gauge comprising a shank, a plurality of adjustable blades associated with said shank, mechanism for adjusting said blades radially, means for limiting said radial adjustment within predetermined limits, and devices for varying at will said predetermined limits relative to each other.

ALBERT A. MARTELL.